Oct. 11, 1949.                S. WALD                2,484,134
            ELECTRIC MOTOR FOLLOW-UP CONTROL SYSTEM
                       Filed July 1, 1947
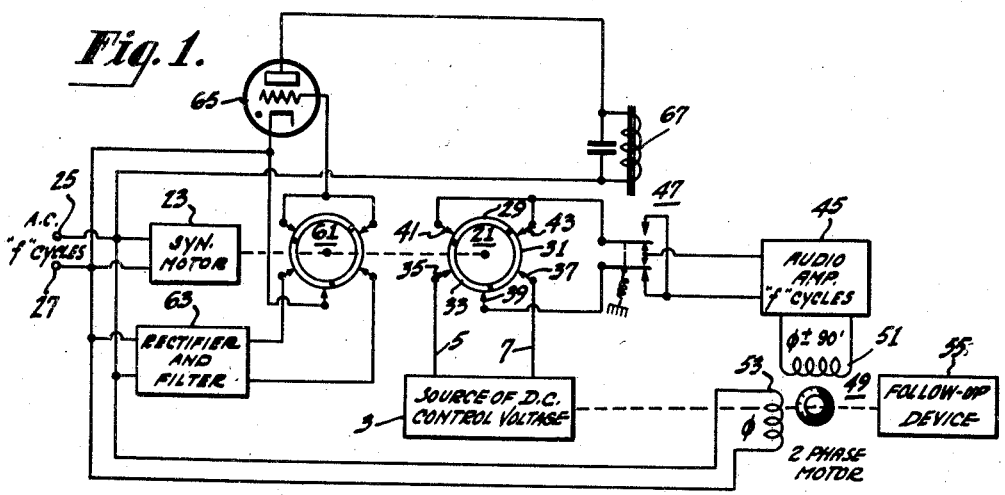
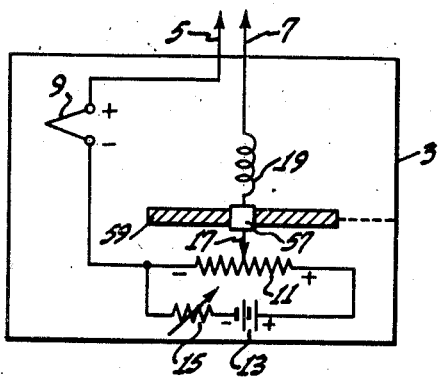
INVENTOR.
SIDNEY WALD Patented Oct. 11, 1949

2,484,134

UNITED STATES PATENT OFFICE

2,484,134

ELECTRIC MOTOR FOLLOW-UP CONTROL SYSTEM

Sidney Wald, Philadelphia, Pa., assignor to Radio Corporation of America, a corporation of Delaware Application July 1, 1947, Serial No. 758,453

6 Claims. (Cl. 318—28)

This invention relates to follow-up control systems of the type in which a D. C. control voltage, whose polarity and amplitude correspond, respectively, to the sense and degree of a controlling condition, is used to control the direction of rotation of a two phase alternating current motor, and in particular to such a system which employs a commutator driven by a synchronous motor to convert the D. C. control voltage into an alternating voltage suitable for the control of the motor.

A system of the general type considered is described in U. S. Patent 2,300,742, issued to T. R. Harrison, et al., on November 3, 1942.

In accordance with previously known systems, the variation of some conditions, such as the quantity of heat, light, distance, or any other factor which is to control the operation of some responsive device, such as a recorder, indicator, or the like, operates through a responsive device to produce a small D. C. voltage representative of the condition and which becomes positive or negative with respect to a reference voltage level in accordance with the variation of the condition above or below some predetermined reference value. Because the voltage produced is very small it is necessary to provide sufficient amplification to drive the motor or other output device.

A. C. amplifiers are usually preferred over D. C. amplifiers, and two-phase A. C. reversing motors having one phase winding energized by the commercial A. C. power line are likewise used in preference to D. C. motors. Consequently, it has been proposed to reverse or interrupt the connections to the D. C. voltage source in synchronism with the A. C. line voltage to produce a square wave voltage. The latter voltage is then amplified and filtered to produce a sine wave alternating current for exciting the other phase winding of the motor. The two currents are made to have a phase quadrature relationship and the motor will then run in a given direction. As is well known, if the phase of one of the exciting currents is reversed, the direction of rotation of the motor will likewise reverse. It will be appreciated that the phase of the amplified current will have one value with respect to the line current when the D. C. control voltage is positive and the opposite phase when the control voltage is negative. The direction of variation of the control voltage thus controls the direction of rotation of the motor.

Electronic switching of very small D. C. voltages is not desirable because differences in tube characteristics, circuit components and supply voltages tend to unbalance and distort the output voltage. Synchronous vibrators driven by the line voltage are adversely affected by mechanical vibration, and are thus unsuitable for use on aircraft. A commutator driven by a synchronous motor would provide the preferred solution to the switching problem except for one factor which it is the primary purpose of this invention to eliminate. This factor is that when a synchronous motor is started it may "pull-in" arbitrarily at one of two possible rotor positions. Consequently, the position of the rotor, and thus of the commutator, may lag or advance so as to effectively reverse the phase of the square wave voltage and cause the motor to rotate in a direction opposite to that desired. In the past, it has been necessary to stop and start the commutator motor until it synchronized properly.

In accordance with the present invention, an auxiliary commutator is provided which monitors the operation of the principal commutator through a control circuit which automatically reverses the phase of the square wave voltage if the commutator motor falls into synchronism in such a manner that the phase of the square wave voltage would be incorrect.

It is therefore a further object of this invention to provide means for automatically correcting the phase of a voltage produced by a commutator which is driven by a synchronous motor.

A further object of this invention is to provide an improved D. C. controlled servo system.

A still further object of this invention is to porvide means for controlling the operation of a two-phase motor in response to variations in a D. C. potential of small amplitude.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Figure 1 is a circuit diagram of a device illustrating the principle of this invention, and Figure 2 is a detail of a portion of the device illustrated in Fig. 1.

Referring to Fig. 1, reference numeral 3 indicates any source of D. C. control voltage of the type in which the D. C. potential of output lead 7 varies in polarity and amplitude with respect to lead 5 in accordance with the sense and degree of variation of a controlling condition with respect to some predetermined reference value.

By way of example, this device may be responsive to changes in temperature, as illustrated in Fig. 2, in which a thermocouple 9 is connected between lead 5 and one end of a potentiometer 11. A battery 13 and adjusting resistor 15 are connected in series across potentiometer 11. The movable contact 17 of the potentiometer is connected to lead 7 through a suitable flexible link 19. Thus, if contact 17 is initially set at about the center of the potentiometer, resistor 15 may be adjusted so that at the temperature the voltage of the thermocouple is exactly balanced out by the potentiometer voltage, and the potential difference between leads 5 and 7 will be zero. If the temperature decreases, lead 5 will become negative with respect to lead 7 by a proportionate amount. If the temperature increases lead 5 will become positive by a proportionate amount, since the two voltages are connected in series bucking.

Leads 5 and 7 are connected to the input of commutator 21 which constitutes switching means for cyclically reversing the polarity of the D. C. control voltage to produce a square wave voltage. The commutator is driven by a synchronous motor 23 energized by the commercial A. C. line applied to terminals 25, 27. The number of switching commutator segments is determined by the motor speed, so that the frequency of the square wave voltage is equal to the line frequency. Assuming, for the purpose of illustration, that the "commercial" line frequency is 400 C. P. S., as is standard on aircraft, and that the motor 23 is a six pole motor rotating at a speed of 8000 R. P. M., or 133⅓ R. P. S., three equal commutator segments 29, 31 and 33 will be required. Each segment will be as nearly equal to 120° as the requirements of suitable insulation will permit. Input is applied to contacts 35 and 37, spaced 120° apart. Output is taken from contact 39 lying midway between the input contacts, and contacts 41 and 43 spaced 60° from the input contacts, respectively.

The commutator output is connected to the input of an audio frequency amplifier 45 through a reversing switch 47. The amplifier is preferably tuned to the line frequency so as to filter out the square wave and produce substantially sine wave output current sufficient to actuate the follower motor 49. The amplifier output is applied to one field winding 51 of the two-phase motor 49. The other field winding 53 is connected to the line. The requisite 90° phase relation between the currents applied to the two field windings may be provided either by suitably designing the amplifier, or by inserting the necessary time delay circuits in one or the other field winding circuits.

Motor 49 drives any desired follow-up device 55. The movement of the rotor may, if desired, be transmitted back to potentiometer 11 by a suitable mechanical link so as to rebalance the D. C. network. This may be accomplished, for example, by mounting contact 17 on a carrier 57 which, for example, may be in the form of an internally threaded nut adapted to ride on a screw threaded rod 59 which is rotated in one direction or the other under the control of motor 49.

It will be observed that the phase of the amplifier output current and thus the direction of rotation of motor 49 is under the control of the phase of the square wave voltage output of commutator 21, and thus of the polarity of the D. C. control voltage produced by device 3. If, however, motor 23 does not always fall into step so that the commutator 21 is not always in a given position at the instant the reference line voltage passes through some reference value, say maximum positive voltage, or in duplicate positions displaced therefrom by multiples of 120°, the phase of the square wave voltage will be reversed, and motor 49 will rotate in the wrong direction. Thus if motor 23 falls in 60° ahead of its proper position, which it may do as it is a six pole motor, for example, commutator 21 will be advanced 60° at the instant the line voltage reaches its reference value, and it will be seen that this will reverse the polarity of the commutator output.

To correct this ambiguity automatically a monitor circuit is provided. A second commutator 61 is provided which is identical to the first commutator 21 and driven at the same speed by the same motor 23. The input is a constant D. C. voltage produced by a battery or by a rectifier and filter 63 connected to the power line. The output of the second commutator is applied between the cathode and grid of a gas-filled tube 65 commonly known as a "Thyratron." The cathode is also connected to one side of the power line while the anode is connected to the other side of the power line through coil 67 which actuates reversing switch 47 when tube 65 is conducting.

The polarity of the output of rectifier 63 is such that when commutator 21 is properly oriented the square wave monitor voltage applied to tube 65 will be out of phase with the A. C. plate voltage, and the tube will remain non-conducting. If, however, in starting up, motor 23 synchronizes in the incorrect position in which the rotor is advanced 60° with respect to the line voltage, the phase of the square wave voltage applied to tube 65 will also reverse, and will then be in phase with the Thyratron plate voltage, causing the tube to draw plate current and operate the polarity reversing switch 47. This switch will be held in its reversed position so long as the output of the first commutator 21 is reversed, and thus normal operation is restored automatically.

It will be understood that the polarity reversing switch 47 may be connected in any point of the circuit which will produce a reversal in the phases of the currents applied to field coils 51 and 53. Thus the reversing switch may be included in the leads 5 and 7 in the amplifier output circuit, or in the leads connecting the field coil 53 to the line.

What I claim is:

1. In a control system, the combination of a source of D. C. control voltage whose polarity and amplitude correspond, respectively, to the sense and degree of a controlling condition; a source of alternating current, switching means for cyclically reversing the polarity of said control voltage to produce a square wave voltage whose frequency is equal to the frequency of said alternating current; and which may have a desired phase with respect thereto, or a phase displaced 180° from said desired phase; a two-phase motor energized by said alternating current and by a current under the control of said square wave voltage, the direction of rotation of said motor being determined by the phase of said square wave voltage; and monitor means responsive to deviation of the phase of said square wave voltage from said desired phase to reverse the phase of said square wave voltage, whereby the direction of rotation of said motor is determined by said D. C. control voltage.

2. A device of the character described in claim 1 in which said monitor means includes an auxiliary commutator driven by said synchronous motor for producing a monitor voltage, a tube controlled by the phase relation of said monitor voltage and said source of alternating current, and a polarity reversing switch controlled by said tube.

3. In a control system the combination of a source of D. C. control voltage whose polarity and amplitude correspond, respectively, to the sense and degree of a controlling condition; a source of alternating current, a commutator driven by a synchronous motor for cylically reversing the polarity of said control voltage to produce a square wave voltage whose frequency is equal to the frequency of said alternating current, said synchronous motor being energized by said alternating current; the phase of said square wave voltage with respect to said alternating current being dependent upon the orientation at synchronous speed of the rotor of said motor, a two-phase motor energized by said alternating current and by a current under the control of said square wave voltage, and polarity reversing means responsive to the relationship between the phase of said alternating current source and the position of said commutator to maintain a predetermined phase between the polarity of said control voltage and direction of rotation of said two-phase motor independently of the orientation of said rotor.

4. A device of the character described in claim 3 in which said polarity reversing means includes a switch, and means for controlling the operation of said switch in accordance with the orientation of the rotor of said synchronous motor.

5. A device of the characted described in claim 4 in which said means for controlling the operation of said switch includes means for producing an alternating reference voltage whose phase depends upon the orientation of said rotor, a discharge tube having its plate and cathode electrodes connected across said source of alternating current, and means for applying said reference voltage to the grid and cathode of said tube in such relative polarity that said tube is normally non-conductive, said switch being in the plate circuit of said tube.

6. A device of the character described in claim 5 in which said means for producing a reference voltage includes a second commutator driven by said synchronous motor.

SIDNEY WALD.

REFERENCES CITED

The following references are of record in the file of this patent:

UNITED STATES PATENTS

| Number | Name | Date |
|---|---|---|
| 2,150,006 | Parker et al. | Mar. 7, 1939 |